United States Patent Office 3,387,000
Patented June 4, 1968

3,387,000
FLUORIMINO PIPERAZINES
James Andrew Gibson, Prestwick, and James Brown Parker, Kilwinning, Scotland, assignors, by mesne assignments, to the United States of America as represented by the Secretary of the Navy
No Drawing. Filed Mar. 24, 1966, Ser. No. 538,898
Claims priority, application Great Britain, Apr. 28, 1965, 17,898/65
9 Claims. (Cl. 260—268)

This invention relates to a novel piperazine derivative, 2,3,5,6-tetrafluoriminopiperazine and to its partial-hydrolysis products, 2,3,5-trifluorimino-6-ketopiperazine and bisfluorimino-diketopiperazine, and to the preparation of these compounds. These compounds are useful energetic constituents of high energy propellant compositions.

In accordance with the process of the invention, 2,3,5,6-tetrafluoriminopiperazine is prepared by reacting 2,3,5,6-tetrahydroxypiperazine-1,4-disulphonic acid, or a salt, ester or ether thereof, with difluoramine in an inert atmosphere in the presence of an acidic condensing agent. 2,3,5-trifluorimino - 6 - ketopiperazine and bisfluoriminodiketopiperazine are formed by the acid hydrolysis of 2,3,5,6-tetrafluoriminopiperazine. The acid hydrolysis may be carried out simultaneously with the preparation of the 2,3,5,6-tetrafluoriminopiperazine, the acidic condensing agent acting as the hydrolysing agent and if the critical reaction time is extended, the partial hydrolysis products may constitute a substantial proportion of the product.

The term "inert atmosphere" is used herein to denote an atmosphere substantially free from any constituent, such as oxygen, which reacts with difluoramine.

The preferred acidic condensing agents are concentrated sulphuric and halogenosulphonic acids such as, for example, fluorosulphonic acid or chlorosulphonic acid, which are especially effective because of their solvent action on the starting material. To avoid possible decomposition of the tetrahydroxypiperazine derivative used as starting material, it is preferable to mix this derivative with the difluoramine before adding the acidic condensing agent.

The 2,3,5,6-tetrahydroxypiperazine-1,4-disulphonic acid used as starting material in the process may be prepared by reacting glyoxal with sulphamic acid or a sulphamate as described in copending application, Ser. No. 538,562, filed Mar. 30, 1966.

The reaction to form 2,3,5,6-tetrafluoriminopiperazine may be represented as

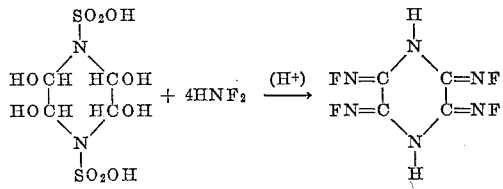

The reaction may conveniently be carried out either under autogenous pressure at room temperature or under atmospheric pressure at a reduced temperature. A convenient procedure is to carry out the reaction under conditions of difluoramine reflux at atmospheric pressure, i.e., at about −23° C. Although there are three theoretically possible geometrical isomers of bisfluorimino-diketopiperazine, it is thought probable that the isomer prepared by acid hydrolysis of 2,3,5,6-tetrafluoriminopiperazine in accordance with this invention is the symmetrical 2,5-bisfluorimino-3,6-diketopiperazine.

The invention is further illustrated by the following examples in which all parts and percentages are by weight.

Example 1

4 parts of difluoramine were refluxed for 4 hours at −80° C. on to 1.0 part of 2,3,5,6-tetrahydroxypiperazine-1,4-disulphonic acid (disodium salt). 9.0 parts of 96% sulphuric acid were added dropwise and difluoramine reflux continued for a further 4 hours. After excess difluoramine was allowed to vent off overnight under a slow stream of nitrogen, the residual reddish-brown liquid was poured on to 40 parts of ice/water and the aqueous solution extracted 5 times with 20 parts of diethyl ether. The combined ether extracts were dried over anhydrous sodium sulphate and then heated gently with a small amount of charcoal. After filtration the ether was removed under vacuum on a rotary film evaporator, leaving 0.5 part (77% of theory) of white solid. The solid was recrystallised from isopropanol, giving 0.3 part of white solid which melted at 230° C. and which was shown by elemental analysis to contain C, 22.6%; H, 0.98%; F, 36.0%; N, 40.4%, and to have a molecular weight (ebullioscopic in acetone) of 209. 2,3,5,6-tetrafluoriminopiperazine, $C_4H_2N_6F_4$, requires C, 22.9%; H, 0.95%; F, 36.2%; N, 40.4%, and molecular weight 210. The product was soluble in methanol and ethanol but practically insoluble in chloroform.

The infra-red spectrum of the product showed peaks at 2.95, 6.15, 10.85, 11.15 and 15.90$\mu$; the peak at 2.95$\mu$ is attributable to N—H absorption, that at 6.15$\mu$ to C=N absorption and those at 10.85 and 11.15$\mu$ to N—F absorption. The ultraviolet spectrum of a methanol solution of the product showed absorptions at 255 m$\mu$ and 327 m$\mu$. The proton magnetic resonance at 60 mc./sec. of the product in acetone solution, using tetramethylsilane internal reference, showed a small peak at 6.41$\gamma$, and a large peak attributable to the hydrogen nuclei of the NH groups at −0.30$\gamma$. The $^{19}$F nuclear magnetic resonance spectrum of the product in acetone solution gave a single peak at 24.0 parts per million to high field of the chlorotrifluoromethane internal reference.

When a ½ kg. mild steel hammer was dropped from a height of 10 cm. on to a thin layer of the solid product on a mild steel anvil, the product detonated, but there was no detonation when the height was 5 cm.

The product burned rapidly when ignited with a flame.

Example 2

4 parts of difluoramine were refluxed for 4 hours at −80° C. on to 1.0 part of 2,3,5,6-tetrahydroxypiperazine-1,4-disulphonic acid (dipotassium salt). 9.0 parts of 96% sulphuric acid were added dropwise and difluoramine reflux continued for a further 4 hours. After removal of excess difluoramine, 0.2 part of the product (34% of theory) were isolated as described in Example 1. The infra-red spectrum of the product was identical to that of the 2,3,5,6-tetrafluoriminopiperazine prepared in Example 1.

Example 3

4 parts of difluoramine were refluxed for 4 hours at −80° C. on to 0.5 part of 2,3,5,6-tetrahydroxypiperazine-1,4-disulphonic acid (dilithium salt). 3.6 parts of 100% sulphuric acid were added dropwise and difluoramine reflux continued for a further 4 hours. After removal of excess difluoramine 0.15 part of the product (41% of theory) were isolated as described in Example 1. The infra-red spectrum of the product was identical to that of the 2,3,5,6-tetrafluoriminopiperazine prepared in Example 1.

Example 4

4 parts of difluoramine were refluxed at −80° C. for 4 hours onto 1.0 part of 2,3,5,6-tetrahydroxypiperazine-1,4-disulphonic acid (disodium salt). 7.0 parts of fluorosulphonic acid were added dropwise to the reaction mixture and difluoramine reflux continued for a further 1 hour. After excess difluoramine has been allowed to vent off overnight in a stream of nitrogen gas the reaction solution was treated as described in Example 1 to yield 0.2 part (31% of theory) of 2,3,5,6 tetrafluoroiminopiperazine, which was identified by means of its infrared spectrum.

Example 5

Reaction of 1.0 part 2,3,5,6-tetrahydroxypiperazine-1,4-disulphonic acid (disodium salt) with 4 parts of difluoramine as described in Example 4, except that 7.0 parts of chlorosulphonic acid were used instead of the fluorosulphonic acid, gave 0.3 part of 2,3,5,6-tetrafluoriminopiperazine, which was identified by means of its infra-red spectrum.

Example 6

5 parts of difluoramine were refluxed at −80° C. for 4 hours on to 1 part of 2,3,5,6-tetrahydroxypiperazine-1,4-disulphonic acid (disodium salt). 1 part of chlorosulphonic acid were added dropwise to the reaction mixture and difluoramine reflux continued for a further 4 hours. After allowing excess difluoramine to vent off overnight in a slow stream of nitrogen the reaction mixture was poured on to 40 parts of crushed ice. The resultant aqueous solution was extracted 4 times with 20 parts of diethyl ether. The combined extracts were dried over anhydrous sodium sulphate. Removal of the ether under reduced pressure gave a white solid which was fractionally recrystallised from isopropanol. 0.3 part (50% of theory) of the less-soluble first fraction, which melted at 206–207° C., was shown by elemental analysis to contain C, 25.0%; H, 1.9%; F, 28.6% N, 37.5%, and to have a molecular weight of 182 (ebullioscopic in acetone). 2,3,5-trifluorimino-6-ketopiperazine, $C_4H_2F_3N_5O$, requires C, 24.9%; H, 1.1%; F, 29.5%; N, 36.3%, and molecular weight 193.

The infra-red spectrum of the first fraction contained peaks at 2.95, 3.1, 5.8, 6.2, 6.3, 10.8, 11.0, 11.15, 13.3 and 14.6$\mu$. The absorption at 5.8$\mu$ is consistent with the presence of a ketone group, and the peaks at 10.8, 11.0, 11.15$\mu$ are in the region associated with NF absorption.

0.08 part (15% of theory) of the more soluble second fraction, which melted at 156–7° C., was shown by elemental analysis to contain C, 28.4%; H, 2.6%; F, 21.6%; N, 33.9%. Bisfluorimino - diketopiperazine, $C_4H_2F_2N_4O_2$, requires C, 27.3%; H, 1.1%; F, 21.6%; N, 31.8%. The infra-red spectrum of the second fraction contained peaks at 2.95$\mu$, attributable to NH group, 5.75, 5.95$\mu$, attributable to C=O, 6.25$\mu$, attributable to C=N and 7.9, 8.3, 9.2, 11.0, 11.15, 11.3 and 11.5$\mu$, those from 11 to 11.5$\mu$ being attributable to the NF group.

Example 7

5 parts of difluoramine were refluxed at −80° C. for 4 hours on to a solid mixture of 1.7 parts of 2,3,5,6-tetrahydroxypiperazine-1,4 - disulphonic acid (disodium salt) and 1 part of paraformaldehyde. 7 parts of 96% sulphuric acid were added dropwise to the reaction mixture and difluoramine reflux continued for a further 4 hours. Treatment of the reaction mixture as described in Example 6 gave 0.4 part (39% of theory) of 2,3,5-trifluoroimino-6-ketopiperazine which was shown by elemental analysis to contain C, 23.8%; H, 2.1%; F, 28.1%; N, 35.9%, to have a molecular weight of 173 (ebullioscopic in acetone) and which had an infra-red spectrum identical to that of the first fraction described in Example 6.

What we claim is:
1. The compound 2,3,5,6-tetrafluoriminopiperazine.
2. The compound 2,3,5-trifluorimino-6-ketopiperazine.
3. The compound bisfluorimino-diketopiperazine.
4. A process for the preparation of 2,3,5,6-tetrafluoriminopiperazine which comprises reacting a compound selected from the group consisting of 2,3,5,6-tetrahydroxypiperazine-1,4-disulphonic acid and an alkali metal salt thereof, with difluoramine in an inert atmosphere in the presence of an acidic condensing agent selected from the group consisting of strongly water-absorbent acidic agents and strongly water-reactive acidic agents.
5. A process as claimed in claim 4 wherein the acidic condensing agent comprises a compound selected from the group consisting of concentrated sulphuric acid and halogenosulphonic acid.
6. A process as claimed in claim 5 wherein the halogenosulphonic acid comprises an acid selected from the group consisting of fluorosulphonic acid and chlorosulphonic acid.
7. A process as claimed in claim 4 wherein the tetrahydroxypiperazine used as starting material is mixed with the difluoramine before addition of the acidic condensing agent.
8. A process as claimed in claim 4 wherein the reaction is carried out under conditions of difluoramine reflux at atmospheric pressure.
9. A process for the preparation of 2,3,5-trifluorimino-6-keto-piperazine or bisfluorimino-diketopiperazine comprising acid hydrolysis of 2,3,5,6-tetrafluoriminopiperazine.

References Cited

UNITED STATES PATENTS 3,162,632  12/1964  Olstowski _____ 260—248

OTHER REFERENCES

Banks, Fluorocarbons and Their Derivatives, Oldbourne Press (London), 1964, pp. 85 to 87.

NICHOLAS S. RIZZO, Primary Examiner.

CARL D. QUARFORTH, Examiner.

L. A. SEBASTIAN, D. DAUS, Assistant Examiners.